Oct. 17, 1961     D. E. GRIFFITH ET AL     3,004,489
AERODYNAMIC STRUCTURAL SEPARATION DEVICE AND METHOD
Filed Jan. 9, 1958
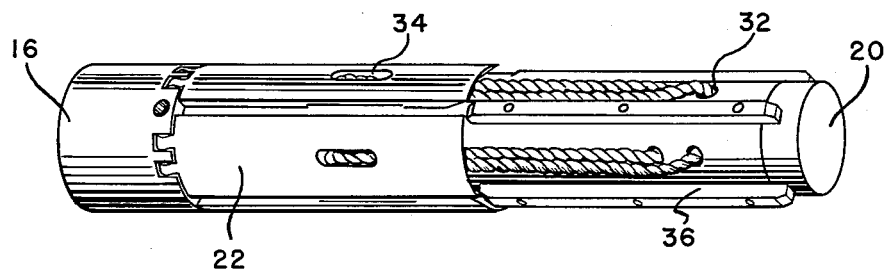
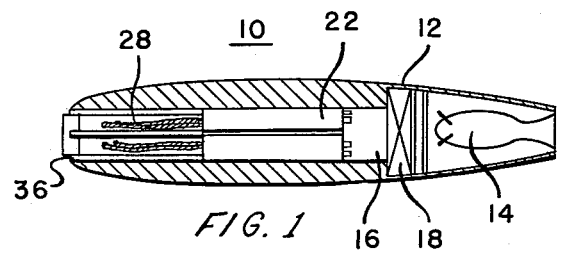
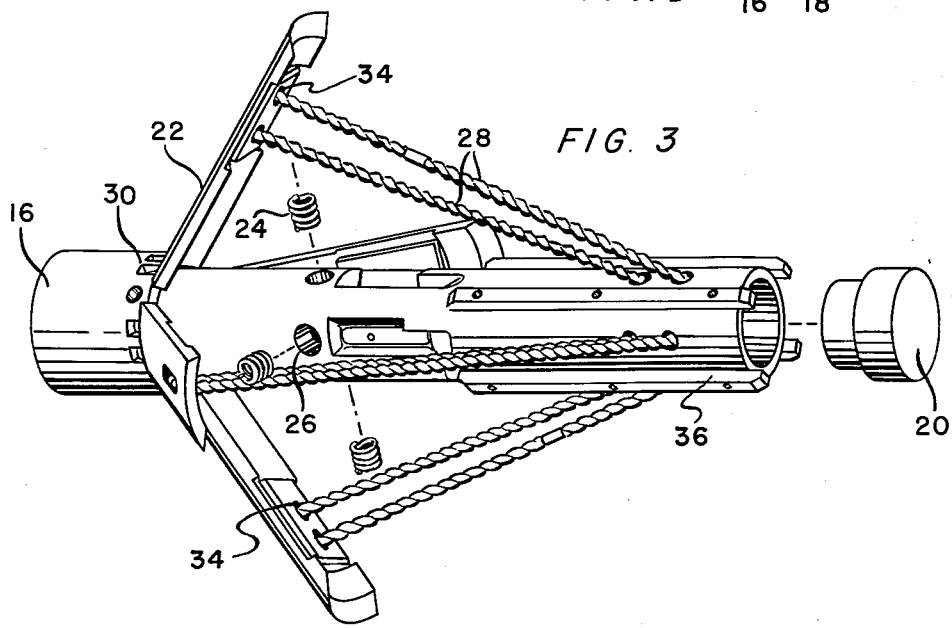
*INVENTOR*
David E. Griffith
Richard H. Heffelfinger
by *Alfred B. Levine*

United States Patent Office 3,004,489
Patented Oct. 17, 1961

3,004,489
AERODYNAMIC STRUCTURAL SEPARATION DEVICE AND METHOD
David E. Griffith, Philadelphia, Pa., and Richard H. Heffelfinger, Camden, N.J., assignors to General Electric Company, a corporation of New York
Filed Jan. 9, 1958, Ser. No. 707,991
3 Claims. (Cl. 102—49)

The present invention relates to an aerodynamic structural separation device and more particularly to an aerodynamic device for separating components of a high speed vehicle.

Insofar as is presently known, there is no known method for separating high drag to weight ratio nose cones from booster vehicles at high Mach numbers, low altitude and high separation rates. It would be extremely desirable to have a means and method for separating high drag to weight ratio nose cones from their supporting structures in high speed booster vehicle development. In this manner, the principle employed in inexpensive, small-scale range firings can be used for larger scale free flight, whereupon aerodynamic effects such as temperatures, pressure, and noise on nose cone afterbody structures can be telemetered back to ground receiving stations for analysis. Thus far, the effects of temperature, pressure, and noise on afterbody structures have not been accurately determined with respect to high speed vehicles, such as missiles, and the like.

The present invention provides a high speed vehicle having an ejectable auxiliary or booster vehicle detachably supporting a nose cone thereon. The booster vehicle is provided with a plurality of drag flaps inoperatively maintained flush with the surface thereof to permit unhindered structural coupling with the high speed vehicle. Upon predetermined separation of the booster vehicle from the high speed vehicle, the plurality of drag flaps are forced open from the surface of the booster vehicle to provide a braking action which permits the nose cone to separate therefrom and continue in its free flight. In actual use on free flight models, the nose cones associated therewith will be instrumented to measure afterbody temperature, pressures, and aerodynamic noise to more effectively achieve the efficient design and operate the nose cone.

In addition, the booster vehicle is provided with a plurality of biasing flap actuating devices to initiate flap movement to an open position after the booster vehicle is separated from the high speed vehicle. Suitable retaining means, such as nylon cords, or the like, are utilized to maintain the flaps at a desired opened angle, for example, at approximately 90°, with respect to the surface of the booster vehicle so that maximum drag is developed. In this manner, at the point of separation of the nose cone from the booster vehicle, the nose cone becomes a free body in space, so that as a test vehicle, aerodynamic forces and characteristics can be studied in an environment similar to the operational environment of the nose cone.

An object of the present invention is a provision of an aerodynamic responsive booster vehicle for separating a nose cone therefrom to continue in free flight.

Another object is to provide a method for separating high drag to weight ratio nose cones from booster vehicles at high Mach numbers.

A further object of the invention is the provision of a booster vehicle provided with aerodynamic braking action to permit separation of a high drag to weight ratio nose cone therefrom.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a plan view, partly in section, of a preferred embodiment of the invention;

FIGURE 2 is a perspective view of the device showing the operational attitude thereof after separation of the booster vehicle from the high speed carrying vehicle; and FIGURE 3 is a perspective view of the device showing the ejection of the biasing flap actuating devices from the booster vehicle.

Referring now to the drawings, there is illustrated in FIGURE 1 a preferred embodiment 10, comprising a high speed carrying vehicle 12 provided with propelling means 14 and a coaxial auxiliary or booster vehicle 16 removably supported therein. A suitable separation or ejecting device 18, such as explosive means, or the like, is provided between the inner end of the booster vehicle 16 and the vehicle 12 to predeterminedly eject the booster vehicle from its carried position. A nose cone 20 is mounted on the nose of the booster vehicle as illustrated in FIGURE 2 to be removed therefrom when in freeflight since the booster vehicle decelerates at a faster rate than the cone.

As illustrated in FIGURES 2 and 3, the booster vehicle 16 is provided with a plurality of drag flaps 22 hinged on the exterior surface of the booster vehicle and flush thereto when in an inoperative position. Each one of the flaps is operatively biased by a flap actuating device, such as coil springs 24, or the like, removably placed within suitable bores 26 provided on the body of the booster vehicle in juxtaposed relationship with the coacting drag flap. Nylon cord 28 is provided for each flap 22, to couple the flap with the booster vehicle to maintain the drag flap at approximately the desired degree of attitude with respect to the vehicle. Nylon cord, having the properties of high kinetic energy absorption and low weight, is utilized because of its ability to absorb a large amount of impact energy at the time of initial opening of the drag flaps. The cords at initial flap opening usually allow the flaps to open to a greater angle than, for example, the angle shown in FIGURE 3, and eventually normalize the flaps to the predetermined open angle.

The nose cone 20 is formed as a high drag to weight ratio body having predetermined aerodynamic characteristics in free-flight condition independent of the booster vehicle 16. The auxiliary or booster vehicle primarily supports the nose cone and pivotally supports thereon the drag flaps 22 with their arresting cables 28, and the biasing flap actuating device in a very compact assembly which is suitably installed within the high speed vehicle 12. The drag flaps 22 are preferably metallic structural members characterized by high stiffness, and having a flap geometry chosen to yield a specified aerodynamic drag in an open position to permit separation of the nose cone by permitting relatively different deceleration rates therebetween.

The flaps are hinged to the booster vehicle through suitable hinge means, such as circumferential hinge 30. The hinge is designed to permit the inoperative attitude of the flaps to be in a flushed position to the cylindrical surface of the booster vehicle 16, to allow unobstructed ejection or removal of the booster vehicle from within the missile 12. The arresting cables are individually attached to a forward portion of the booster vehicle, such as being looped through suitable apertures 32 provided on the booster vehicle 16 and through a pair of selectively placed apertures 34 on the interior of the drag flap.

If deemed necessary for specified aerodynamic design conditions, the number of drag flaps 22 may be varied in number and in aerodynamic characteristics; however, it will be obvious, that a minimum of two flaps are required. Further, for specified aerodynamic loading conditions, various number and sizes of arresting cables 28 may be used. Also, longitudinal runners 36 are secured to a portion of the surface of the booster vehicle 16 to permit proper coaxial mounting of the vehicle within the missile 12 by obtaining a constant overall diameter.

In the operation of the preferred embodiment 10, the flaps 22 are initially flush with the surface of the booster vehicle 16. The booster is removably inserted within the high speed vehicle 12, which transports the body to any predetermined ejection point whereupon the ejection mechanism 18 is automatically actuated to eject the booster vehicle from the high speed vehicle. After the ejection of the booster the coil springs 24, no longer resisted by the compressive reaction of the inner surface of the missile 12 on the flaps, release the flaps 22 and force them into the airstream. In this manner, the forces produced by the airstream rotate the flaps about the hinges 30 into their full open position with respect to the booster vehicle 16. The arresting cables 28 will absorb the rotational kinetic energy of the drag flaps and retain them in a predetermined angular position relative to the longitudinal axis of the booster vehicle.

Hence, with the flaps in the open and decelerating attitude, the body 16 will decelerate at a faster rate than the nose cone 20 which is removably placed therein. Consequently, since the booster vehicle is decelerating faster than the nose cone, the two components will separate from each other as shown in FIGURE 3. The deceleration rate of the vehicle 16 can be controlled by specifying the geometry of the flaps 22 and the weight of the booster vehicle. As will be seen in FIG. 3, the nose cone 20 is slideably mounted in the front end of the auxiliary vehicle 16 and the nose cone 20 is free of any restraining structure interconnecting with the auxiliary vehicle 16 which would prevent the nose cone 20 from being immediately separated from the auxiliary vehicle 16 once the flaps 22 are opened. Thus there is prevented any tendency for transfer of the effect of the controlled deceleration of the auxiliary vehicle 16 by the flaps 22 to the nose cone 20. In this manner, a drag separation method is disclosed which makes possible the separation of high drag to weight ratio nose cones at higher rates than have previously been obtainable under high Mach numbers and low altitude conditions. Accordingly, the aerodynamic forces and characteristics, such as body temperatures and pressures, associated with a free body in space can be studied in an environment similar to that encountered by an operational nose cone.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. An aerodynamic structural separation device for a high-speed vehicle comprising an auxiliary vehicle ejectably mounted within the high-speed vehicle and having drag-producing means mounted thereon, a nose cone supported and held by the forward end of said auxiliary vehicle and unrestrained as to forward movement relative to said auxiliary vehicle, means on said high-speed vehicle for maintaining said drag-producing means in inoperative position while said auxiliary vehicle is carried by said high-speed vehicle, means for ejecting said auxiliary vehicle from said high-speed vehicle, and means for actuating said drag-producing means to an operative position away from the outer surface of said auxiliary vehicle to decelerate said auxiliary vehicle with respect to its normal free flight, said nose cone being slideably mounted in the front end of said auxiliary vehicle for free flight out of said auxiliary vehicle upon actuation of said drag-producing means thereby eliminating the transfer of the effect of the deceleration of said auxilary vehicle by said drag-producing means to said nose cone to decelerate or otherwise interrupt the free flight of said nose cone.

2. An aerodynamic structural separation device for a high-speed vehicle comprising an auxiliary vehicle ejectably mounted within the high-speed vehicle and having a plurality of drag flaps pivotally mounted thereon, a nose cone supported on the forward end of said auxiliary vehicle and unrestrained as to forward movement relative to said auxiliary vehicle, means on said high-speed vehicle for maintaining said drag flaps in closed position closely adjacent the outer surface of said auxiliary vehicle while the latter is carried by said high-speed vehicle, means for ejecting said auxilary vehicle from said high-speed vehicle, and means for actuating said plurality of drag flaps to an extended position away from the outer surface of said auxiliary vehicle to decelerate said auxiliary vehicle with respect to its normal free flight, said nose cone being slideably mounted in the front end of said auxiliary vehicle for free forward flight out of said auxiliary vehicle upon deceleration of the latter thereby producing immediate separation of said nose cone from said auxiliary vehicle and avoiding transfer of the effect of the deceleration of said auxiliary vehicle by said drag flaps to said nose cone.

3. An aerodynamic structural separation device according to claim 2 wherein each of said drag flaps has an impact resistant nylon cord coupled to said auxiliary vehicle to limit the angular movement of said flaps to their extended positions away from the outer surface of said auxiliary vehicle.

References Cited in the file of this patent

UNITED STATES PATENTS

| | | |
|---|---|---|
| 1,318,926 | Settle | Oct. 14, 1919 |
| 1,365,865 | Svejda | Jan. 18, 1921 |
| 1,834,149 | Goddard | Dec. 1, 1931 |
| 1,978,641 | Martin | Oct. 30, 1934 |
| 2,397,114 | Anzalone | Mar. 26, 1946 |
| 2,913,983 | Lytle | Nov. 24, 1959 |

FOREIGN PATENTS

| | | |
|---|---|---|
| 473,958 | Great Britain | Oct. 22, 1937 |